C. H. EICKHOF.
COLLAPSIBLE POULTRY COOP.
APPLICATION FILED JUNE 19, 1917.

1,237,624.

Patented Aug. 21, 1917.

Witnesses
E. L. Pumphrey
C. C. Chandler

Inventor
C. H. Eickhof
By Chandler & Chandler
Attorney

UNITED STATES PATENT OFFICE.

CHARLES H. EICKHOF, OF CHICAGO, ILLINOIS.

COLLAPSIBLE POULTRY-COOP.

1,237,624.  Specification of Letters Patent.  Patented Aug. 21, 1917.

Application filed June 19, 1917. Serial No. 175,646.

*To all whom it may concern:*

Be it known that I, CHARLES H. EICKHOF, a citizen of United States, residing at Chicago, in the county of Cook, State of Illinois, have invented certain new and useful Improvements in Collapsible Poultry-Coops; and I do hereby declare the following to be a full, clear, and exact description of the invention, such as will enable others skilled in the art to which it appertains to make and use the same.

This invention relates to improvements in poultry coops and has for its primary object to provide a poultry coop which may be quickly and conveniently collapsed into compact form for storage or shipment and as readily set up for use.

A further object of the present invention resides in the provision of a coop of the above character which is of an extremely simple and durable construction, and may be manufactured and marketed at a relatively low cost.

With the above and other objects of similar nature in view, the invention consists in the construction, combination and arrangement of parts, set forth in and falling within the scope of the appended claim.

In the drawing:—

Figure 1:
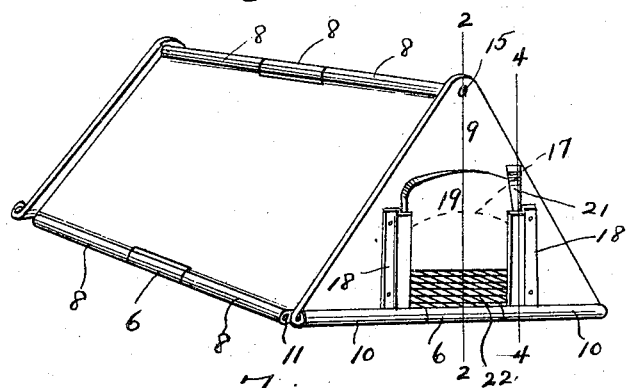
Figure 1 is a perspective view of a collapsible poultry coop constructed in accordance with the invention.
Figure 2:
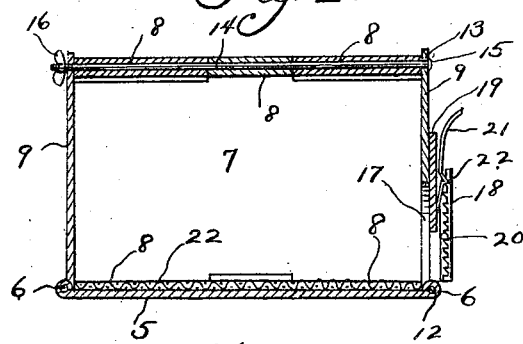
Fig. 2 is a transverse section therethrough.
Figure 4:
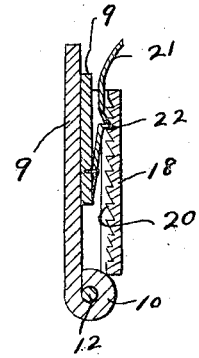
Fig. 4 is a detailed section through the door and an adjacent guide member showing the securing means therefor.
Figure 3:
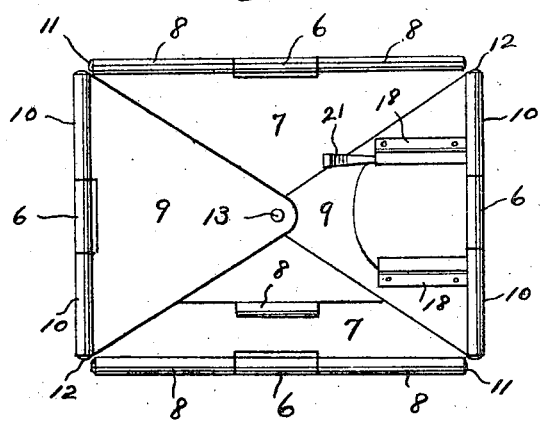
Fig. 3 is a plan view of the coop collapsed.

Referring now more particularly to the accompanying drawing, my improved poultry coop is, when set up for use, of substantially triangular prism formation, and consists generally speaking, of a plurality of sheet metal sections, constructed and arranged in a manner to be described whereby they may be quickly and conveniently disconnected and collapsed for storage or transportation.

Specifically the improved coop consists of a rectangular bottom wall 5 provided at its side and end edges with tubular extensions 6, similarly shaped side walls 7 provided on their longitudinal edges with tubular extensions 8, and triangular shaped end walls 9 the bases of which also are provided with tubular extensions 10.

The side walls 7 are arranged with the tubular extensions 8 on corresponding edges in alinement with the extensions 6 at opposite sides of the bottom wall and are hingedly connected with the latter by means of rods 11 passed through said extensions. The bases of the end walls 9 are also hingedly connected to the bottom wall through the medium of rods 12 passed through the extensions 10 and the corresponding extensions 6 of the base.

When it is set up in position, the side walls 7 are disposed with the tubular extensions 8 at their free edge portions in axial alinement, while provided in the end walls 9 adjacent their apices are apertures 13 which register with the tubular extensions, a rod 14 being removably inserted through said extensions and apertures to maintain said walls in their relative positions. The rod 14 is provided at one end with a head 15 while its opposite end is suitably threaded and has engaged therewith a nut 16. Accidental displacement of the rod is thus effectively prevented.

When it is desired to collapse the coop it is only necessary to remove the nut 16 and withdraw the rod 14 after which the side walls are folded upon the bottom and the end walls then folded upon the side walls, the form of the coop so collapsed being extremely compact and requiring but little space for storage or transportation.

Access is gained to the interior of the coop through a door opening 17 provided in one of the end walls 9 while arranged on each side of said opening are a pair of angular guide members 18 in which is slidably mounted a door 19 movable to cover and uncover the opening. A longitudinal series of ratchet teeth 20 is provided on the inner face of one of the guide members 18, while a handle 21 of spring metal is secured at its lower end to the door and has a shoulder 21 intermediate its ends which coöperates with the ratchet teeth to hold the door in adjusted position with respect to the opening 17. The upper end of the handle 21 is slightly curved outwardly whereby it may be conveniently grasped and manipulated to operate the door, a slight inward pressure thereon serving to disengage the shoulder from the ratchet teeth as will be evident from the drawing.

There is also supported upon the bottom 5 of the coop a section 22 of metal screen which may be readily removed when it is necessary to clean the coop.

What I claim is:—

A collapsible poultry coop consisting of a bottom, side walls hinged to the bottom and foldable thereupon, end walls hinged to the bottom foldable upon the side walls, said side walls having alined tubular extensions on their free longitudinal edges, and said end walls having apertures registering with said extensions and a rod passed removably through said registering apertures and extensions.

In testimony whereof, I affix my signature in the presence of two witnesses.

CHARLES H. EICKHOF.

Witnesses:
M. J. SPURLOCK,
CHAS. DATTILE.

Copies of this patent may be obtained for five cents each, by addressing the "Commissioner of Patents, Washington, D. C."